United States Patent
Thompson

(10) Patent No.: US 8,313,088 B2
(45) Date of Patent: Nov. 20, 2012

(54) SERVICE STAND FOR LAWN MOWERS AND ATV'S

(76) Inventor: Bradley M. Thompson, Atkins, AR (US)

( * ) Notice: Subject to any disclaimer, the term of this patent is extended or adjusted under 35 U.S.C. 154(b) by 409 days.

(21) Appl. No.: 12/799,063

(22) Filed: Apr. 19, 2010

(65) Prior Publication Data

US 2011/0253952 A1  Oct. 20, 2011

(51) Int. Cl.
*B66F 7/24* (2006.01)

(52) U.S. Cl. ......... 254/88; 254/89 R; 254/90; 254/93 H; 254/93 L

(58) Field of Classification Search ............ 254/88, 254/93 L, 93 H, 90, 89 R
See application file for complete search history.

(56) References Cited

U.S. PATENT DOCUMENTS

| | | | |
|---|---|---|---|
| 4,084,790 A * | 4/1978 | Molnar | 187/215 |
| 4,724,930 A * | 2/1988 | VanLierop | 187/204 |
| 4,848,732 A * | 7/1989 | Rossato | 254/90 |
| 4,958,804 A | 9/1990 | Lenius | |
| 5,096,171 A | 3/1992 | Kendrick | |
| 5,339,926 A | 8/1994 | McCanse | |
| 5,632,475 A | 5/1997 | McCanse | |
| 5,678,804 A | 10/1997 | Lintelman | |
| D401,601 S | 11/1998 | Kalpagian | |
| 6,059,263 A * | 5/2000 | Otema et al. | 254/89 H |
| 6,102,370 A * | 8/2000 | Johnston | 254/89 H |
| 6,139,247 A | 10/2000 | Wright | |
| 6,173,941 B1 * | 1/2001 | Johnston | 254/89 H |
| 6,182,796 B1 * | 2/2001 | Perlstein et al. | 187/208 |
| 6,474,626 B1 | 11/2002 | Box | |
| 6,488,255 B2 | 12/2002 | Lowmaster | |
| 6,675,847 B2 | 1/2004 | Noden | |
| 7,350,791 B2 | 4/2008 | Wu | |
| 2008/0156589 A1 | 7/2008 | Marchand | |

* cited by examiner

*Primary Examiner* — Basil Katcheves
*Assistant Examiner* — Beth Stephan
(74) *Attorney, Agent, or Firm* — Stephen D. Carver

(57) ABSTRACT

A portable, user configurable service stand for a variety of riding lawnmowers and other motorized implements. The stand comprises a rigid frame with an elongated, longitudinal section spanning between twin, spaced apart vertical frame sections that support the load. Each vertical frame section secures generally planar, horizontal wheel supports. A pair of parallel, removable spans is coupled between front and rear wheel supports to temporarily provide a travel pathway over the stand. Removable, drive-on ramps are pivotally connected to the frame. After a mower is parked on the stand, the spans may be slidably removed, exposing the sides and undercarriage of the mower for convenient access. Upon removal of the spans, a pair of gravity-operated safeties automatically deploys to block the mower front wheels.

13 Claims, 7 Drawing Sheets

SERVICE STAND FOR LAWN MOWERS AND ATV'S

BACKGROUND OF THE INVENTION

1. Field of the Invention

The present invention relates generally to vehicle service stands. More particularly, the present invention relates to portable, user configurable service stands suitable for maintenancing relatively heavy and large riding lawnmowers and similar motorized devices.

2. Description of the Related Art

Riding lawn mowers, also known as "sit down" mowers, have become increasingly popular over the years. Typical riding mowers are much more powerful than "walk behind" mowers, and they usually include larger blades or arrays of blades. Riding mowers have the advantage of speed and comfort, and especially where large acreages need regular mowing, they are extremely worthwhile tools. Modern riding mowers are not limited to mowing; often additional mechanical accessories are available to adapt such mowers for other jobs like leaf gathering or mulching. Furthermore, late model riding mowers are sufficiently powered to tow moderately loaded trailers or other wheeled yard implements. Experienced owners soon find applications other than mowing, so modern riding mowers may be put to substantial uses year round.

While the cutting of lawn grass is much easier and faster with modern riding mowers, and the numerous other advantages and applications of such mowers are not in doubt, periodic maintenance is a vital necessity. Because of the complexity, size and weight of typical modern riding mowers, and the often harsh conditions of use, prudence dictates regular service. It is usually left up to the owner to maintain the mower, and typical owners soon run into many problems of lawn mower maintenance.

One frequent problem relates to under-deck grass build up. When moist grass is encountered, the caking and build-up of grass cuttings can be extreme. As a result, the exit path of the lower mower deck can become blocked. This will cause uneven spreading of the cut grass on a lawn Cleaning of the under deck should be performed many times during the mowing season. Mower blades need to be sharpened or replaced periodically for efficient use. Where V-belts are used to turn the blades, or the blade array, proper belt tensioning is desirable, and occasionally belt replacement is advisable. Of course, the mower engine needs regular service as well-obviously, the oil and oil filter must be changed regularly depending upon the frequency and intensity of mower use. In addition, wheel bearings must often be greased and sometimes replaced, ad other mechanical parts should be periodically lubricated.

It is often difficult to access mechanical regions of the mower requiring service. One problem with riding mowers is the mower deck can usually only be raised four to five inches off the ground. Without unobstructed access to the mower underside, work on the mower deck is difficult to perform. Parts such as blades can be difficult if not impossible to reach, without adequate clearance. Dangers of hand injuries from sharp mower blades is a factor. Even the simple cleaning of the deck underside can result in a time consuming struggle without adequate ground clearance.

Thus, it has been recognized that with a mower disposed a comfortable distance above the ground, service and repairs are made easier and quicker. Many approaches have been taken in the past for manipulating mowers (or analogous devices) for service.

Some designs elevate the mower with a vertically displaceable platform that must be forcibly elevated into position. For example, U.S. Pat. No. 4,958,804 issued to Lenius, et al. Sep. 25, 1990 discloses a lawn mower lift comprising a supporting frame pivoted between raised and lowered positions relative to a lower base frame by a parallelogram linkage. A stop rail maintains the support frame in the raised position by abutting the parallelogram linkage in an overcenter position. The supporting frame lies between parallel side rails of the base frame, which serve as a guide track to properly align a mower on the supporting frame.

Another lifting platform is seen in U.S. Pat. No. 5,339,926 issued to McCanse, et al. on Aug. 23, 1994. A carriage raises mowers or garden tractors to expose their underside for servicing. The vertically movable carriage has two cantilevered lift forks, which may be adjusted along the carriage to accommodate the longitudinal wheelbase of the vehicle. Each lift fork carries two adjustable cups for cradling and supporting vehicle wheels. The cups extend away from the forks to allow free access to crucial components of the vehicle.

U.S. Pat. No. 6,474,626 issued to Box on Nov. 5, 2002 discloses another rack that vertically elevates a mower above ground for service. A base for resting on a support surface supports first and second spaced apart rails to receive wheels of a lawn mower. A first lifter elevationally supports rearward portions of the longitudinal rails above the base, and a second manually operated lifter, independent of the first lifter, elevationally supports forward portions of the rails. Thus, only approximately one half of the weight of a lawn mower need be lifted at a time.

U.S. Pat. No. 6,675,847 issued to Noden on Jan. 13, 2004 discloses an adjustable height workbench. Twin standards, each with a pawl mechanism, provide height adjustments by extending rods that engage ratchet apertures. A safety mechanism prevents inadvertent disengagement of the rod from the ratchet apertures. A tension spring connected between a chain and a foot actuator pedal prevents accidental release of the rod by absorbing unintentional or inadvertent forces applied to the pedal.

Recognized problems with lifting platforms, i.e., ramps or stands employing mechanically driven elevators, include complexity, required strength, and cost. Where self propelled devices such as riding lawnmowers, ATV's, snowmobiles or the like are to be serviced, it is advantageous to elevate these devices using their own power. With ramps lacking driven elevators, there are fewer moving parts, and an element of simplicity is achieved. Further, non-motorized lifts are more reliable, they are more stable, and the likelihood of injury or component breakdown is reduced. When properly designed and deployed, passive service ramps are safer than motorized versions, and they are more cost effective. Without motorized lifting parts, a given cost of material and parts results in a stronger design.

Rather than use powered elevators, some prior art designs merely tilt the apparatus being serviced to expose the undercarriage. For example, U.S. Pat. No. 5,096,171 issued to Kendrick, et al. Mar. 17, 1992 discloses a lawn mower service stand for supporting either a walk-behind type mower or a tilted mower. A central pit for receiving an oil collecting tank receives drained engine oil. U.S. Pat. No. 5,632,475 issued to McCanse on May 27, 1997 discloses a work holding apparatus that is used to tilt heavier devices like mowers. A central lift is movable upwardly and downwardly on a column.

U.S. Pat. No. 5,678,804 issued to Lintelman, et al. Oct. 21, 1997 discloses another tilting device. A mobile jacking device can be wheeled into place for engaging and then tilting a mower to expose the undersides for service. The jacking device comprises a wheeled axle, an extended vertical element secured to the axle, a support secured to the axle, and a gripping piece secured to an end of the support. Preferably, a foot assist bar is also secured to the extended vertical element to assist the lever element in raising the lawn mowing equipment.

Another tilting mechanism is seen in U.S. Pat. No. 6,139,247 issued to Wright Oct. 31, 2000. The transporting apparatus has a tiltable carrying rack hinged to a frame. The rack receives and supports the front of an ATV for towing it about. With the rack tilted, the underside of the vehicle supported by the rack is exposed for service.

U.S. Pat. No. 6,488,255 to Lowmaster issued Dec. 3, 2002 also discloses a tilting device exposing a lawnmower undercarriage for maintenance and/or repairs. It includes a stabilizer for insertion into the ground and a retainer connected to the stabilizer for holding the lawnmower handle adjacent the ground, thereby tilting the lawnmower relative to the ground such that the undercarriage is accessible.

U.S. Pat. No. 7,350,790 to Wilson issued Apr. 1, 2008 provides a tilting dolly for servicing snowmobiles or the like. The dolly engages the front bumper and raises the snowmobile. An auxiliary rear axle is then slid under a rear portion of the snowmobile. A swivel connection on the front bumper-engaging member allows the snowmobile supported by the dolly to be easily maneuvered in tight spaces. The dolly may be reconfigured for use as a jack stand allowing service or repair work to be performed. The dolly is adapted to be towed behind a riding lawnmower, yard tractor, or the like, further enhancing the utility of the dolly.

U.S. Patent Application No. 20080156589 published Jul. 3, 2008 discloses a lifting platform suitable for riding lawn mowers. A load-bearing platform is operated by a lift mechanism. The platform has a number of decks associated with the platform and supported upon a chassis. The decks are movable, or optionally removable, and slide sideways on the chassis provide an adjustable surface support area.

However, tilting mechanisms offer an incomplete solution to the service problem. First, a heavy riding lawnmower that is tilted may be unstable, and repairs can be unsafe and dangerous. While elevated parts of the tilted device may be rendered accessible, the lower parts can remain partially hidden or even blocked. Some service adjustments are best made while the vehicle is level. For example, oil and oil filter changes are best made proximate a level surface, to avoid spillage and to maintain the elevation of the oil input path.

BRIEF SUMMARY OF THE INVENTION

This invention provides a service stand for elevating lawn mowers, ATV's, garden tractors, snowmobiles and the like above ground for service.

The stand preferably comprises a rigid frame adapted to be disposed upon a level supporting surface. The frame comprises an elongated, longitudinal section spanning between twin, spaced apart vertical frame sections that support the load. Each vertical frame section comprises a pair of parallel, spaced-apart stanchions that project upwardly and which secure generally planar, horizontal wheel supports. Normally, a pair of removable spans are coupled between front and rear wheel supports to temporarily provide a travel pathway over the stand. The spans are disposed parallel with one another, and parallel with the longitudinal frame section beneath them.

A first vertical frame section pivotally interconnects with removable, drive-on ramps. A mower driving onto the stand over the ramps traverses the spans until its front wheels contact stops formed on the wheel supports on the second vertical frame section. At this time the vehicle rear wheels will be located on the wheel supports on the first vertical frame section. Once parked on the ramp with the mower wheels positioned as previously mentioned, the driver may stop and park the mower, and climb down from the ramp with the aid of a convenient, deployable step swing mounted to the frame. Afterwards, the spans may be slidably removed, exposing the sides and undercarriage of the mower for convenient access.

Importantly, removal of the spans automatically deploys a pair of safeties that prevent movement of the mower's front wheels. The safeties are automatic, and gravity operated. Once the spans are removed, vertical pegs associated with the safeties are freed for axial displacement, and they are forced upwardly by a counterweighted lever. The pegs assume a position proximate the back of the mower front wheels, to prevent rearward movement of the mower.

Once service is complete, the safeties may be reset, and the spans can be reinstalled. The lawnmower can then be backed off the stand. The arched configuration of the rams minimizes deck contact. Removable wheel guards preferably associated with each front wheel support prevent sideways wheel movements, facilitating use of the stand with zero turn mowers. With service completed, the foldable ramps may be removed, and the stand may be broken down for transportation or storage.

Thus, a basic object of my invention is to provide a user-configurable service stand for riding lawn mowers.

A related object is to provide a stand for riding lawn mowers and other relatively heavy, motor powered implements.

Another important object is to provide a service stand of the character described that accommodates zero turn riding mowers.

A simple object is to make lawn mower servicing easier for the owner.

Another object is to provide a mower service platform that quickly exposes the underneath of the mower for easy access during routine maintenance.

Yet another object is to provide a ramp of the character described that provides a stable support. It is a feature of my ramp that mower weight is distributed evenly about the frame, and the ramps is not likely to flip or turn over.

Still another object of the present invention is to provide a new and improved lawn mower service ramp that is adaptable for use with push-type lawn mowers, all terrain vehicles (i.e., "ATV's"), snowmobiles, lawn tractors, and other small motorized devices.

A still further object of the present invention is to provide a new and improved lawn mower service ramp that exposes the lawnmower deck for service while the mower is disposed horizontally, and does not require tilting.

A related object is to provide a service stand of the character described that does not require powered lifting mechanisms.

Another basic object is to provide a ramp that automatically locks a vehicle being serviced in place.

A further object is to provide a ramp of the character described that can easily accommodate mowers and vehicles of varying sizes, dimensions, and wheelbases. It is a feature of my invention that key frame elements are telescopingly adjustable in length.

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction there-with, and in which like reference numerals have been employed throughout wherever possible to indicate like parts in the various views.

DETAILED DESCRIPTION OF THE INVENTION

Figure 1:
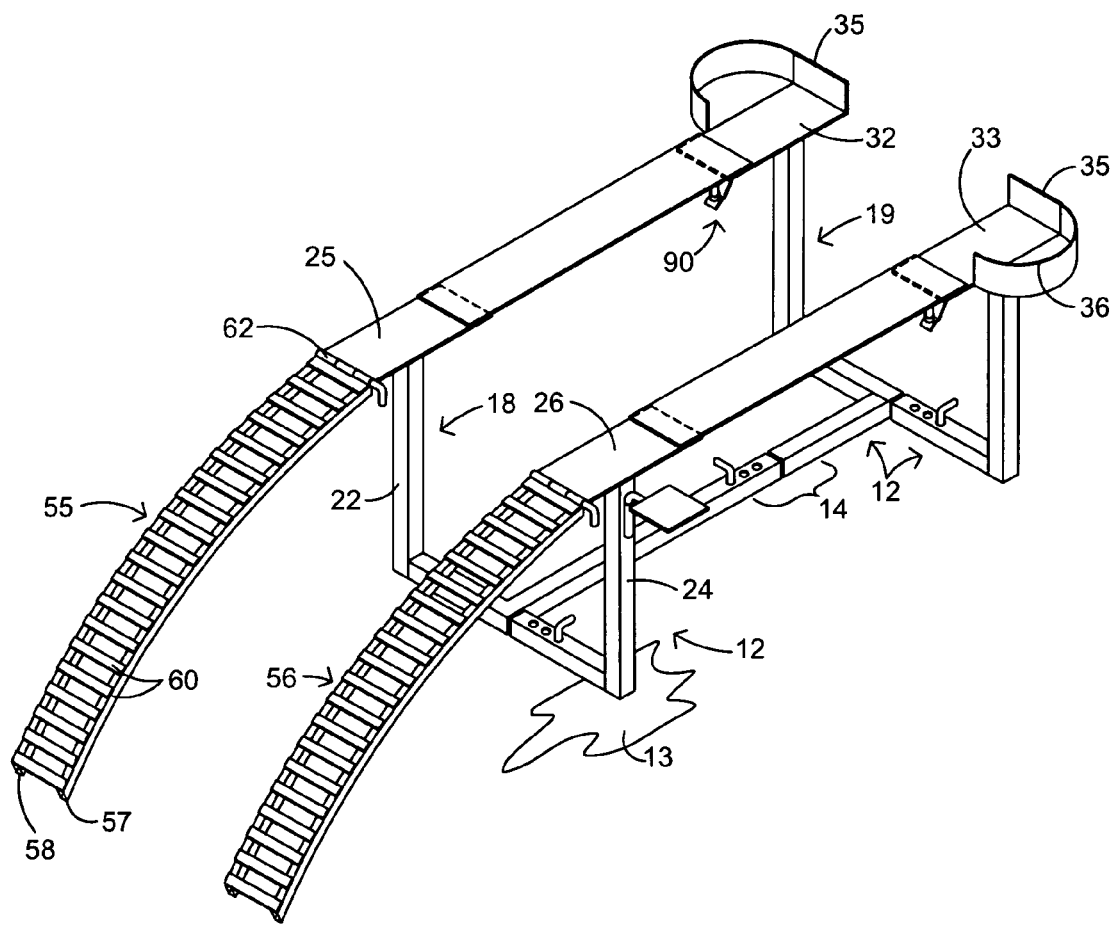
FIG. 1 is an isometric view of my service stand, showing it deployed.

With initial reference directed now to FIGS. 1-4 of the appended drawings, a stand for servicing riding lawnmowers or the like constructed generally in accordance with the best mode of the invention has been generally designated by the reference numeral 10. A variety of motorized implements such as garden tractors, riding lawn mowers, all terrain vehicles (i.e., ATV's), snowmobiles and the like may be driven unto the stand 10, where they are elevated for convenient service.

Stand 10 comprises a rigid frame 12 adapted to be disposed upon a level, supporting surface 13, comprising flat ground or, preferably a level, concrete slab. Frame 12 preferably comprises at least one elongated, longitudinal section 14 that extends between a pair of spaced apart, vertical frame sections 18, 19 that support the load. Each vertical frame section 18, 19 is generally U-shaped, and connected at its bottom to longitudinal frame section 14. Vertical frame section 18 comprises a pair of parallel, spaced-apart stanchions 22, 24 that project upwardly and which secure front, horizontal wheel supports 25, 26. These flat, planar wheel supports 26 support the rear wheels of a mower being serviced, as further explained below.

Vertical frame section 19 at the rear of the stand 10 comprises a pair of similar, parallel, spaced-apart stanchions 28, 29 that project upwardly and secure horizontal wheel supports 32, 33, that support the front wheels of a mower being serviced. Wheel supports 32, 33 include integral, upturned stops 35 that limit forward mower travel atop the stand 10 by contacting the front wheels. Further limitations to wheel movement result from optional wheel guards 36 (FIG. 1, 2) that are removably, slidably fitted to the outer edges of wheel supports 32, 33. These semicircular guards 36 include flat, planar portions that align with wheel supports 32, 33 and integral peripheral semicircular crowns 37 that prevent twisted wheels of backing vehicles, such as zero turn lawn mowers, from falling off supports 32, 33. With most riding mowers, one can drive straight up the arched ramps and onto the platform. After work has been done to the mower, one would normally back straight back off the stand 10. With zero-turn mowers, the front wheels spin around during their backward motion. This could cause the wheels to run off the side of the front platforms before they could make a complete circle, but for the guards 36.

The individual vertical stanchions of each vertical frame section 18, 19 are joined at their bottoms by an elongated, transverse cross-piece 38 overlying the lower support surface 13. Each cross piece 38 is preferably telescopingly adjustable, comprising a first apertured piece 40 slidably coupled to a second apertured piece 41, which is locked to piece 40 by a pin 42. Widthwise adjustments in the dimensions of vertical frame sections 18 and 19 (and frame 12) are thereby rendered possible. Preferably the frame 12 is lengthwise adjustable as well. It is to be noted that the longitudinal frame section 14 preferably comprises a first apertured piece 46 that is slidably fitted to a companion apertured piece 47. The longitudinal frame pieces 46, 47 are similarly locked together by a pin 48. Frame 12 is thus lengthwise adjustable, to accommodate slight variations in vehicle wheelbases.

Figure 5:
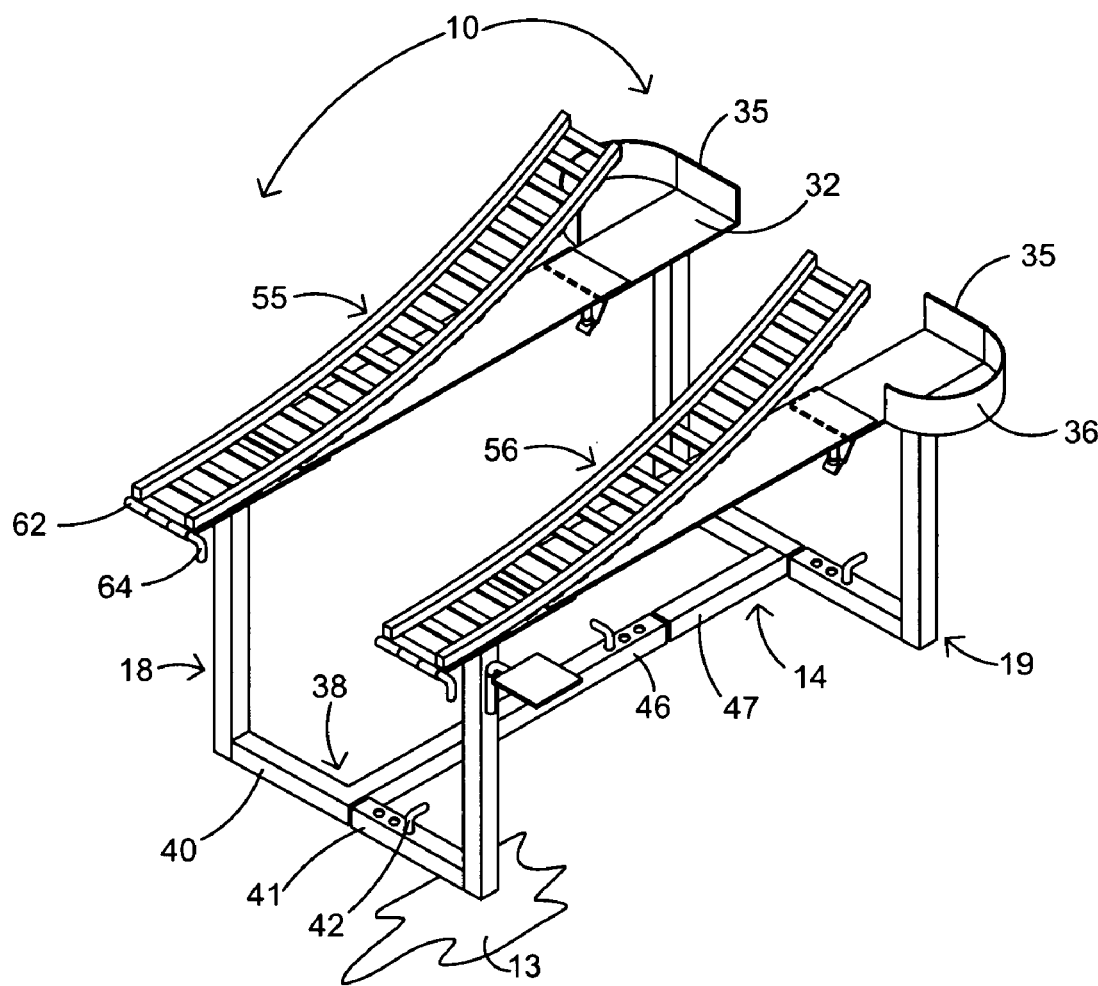
FIG. 5 is an isometric view of the stand in a folded configuration.
Figure 6:
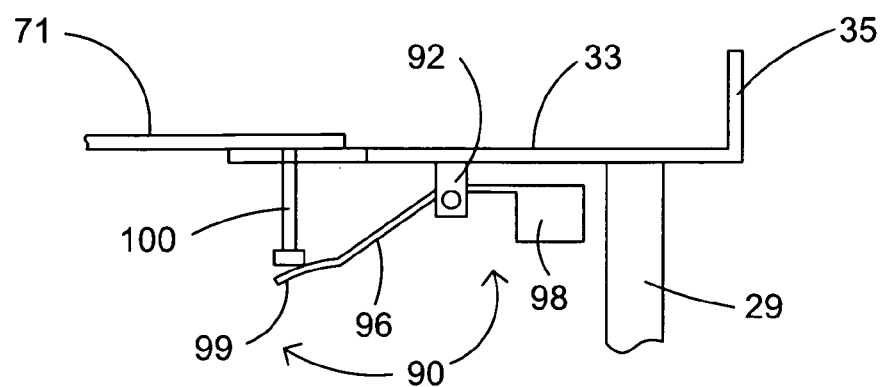
FIG. 6 is an enlarged, fragmentary side elevational view of the automatic wheel lock system, showing it in a rest state.
Figure 7:
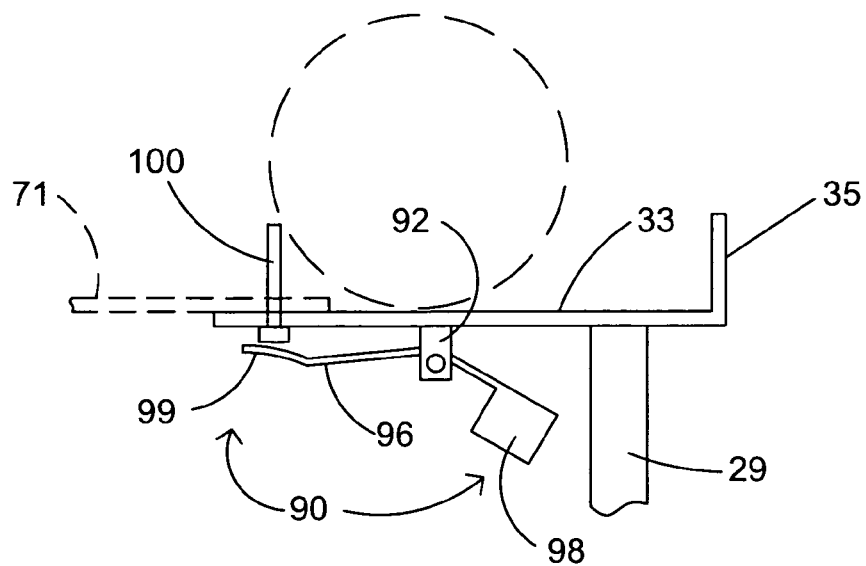
FIG. 7 is an enlarged, fragmentary side elevational view of the automatic wheel lock system, showing it in a deployed state, with a generic lawnmower wheel and a removed wheel guard illustrated in phantom lines.
Figure 8:
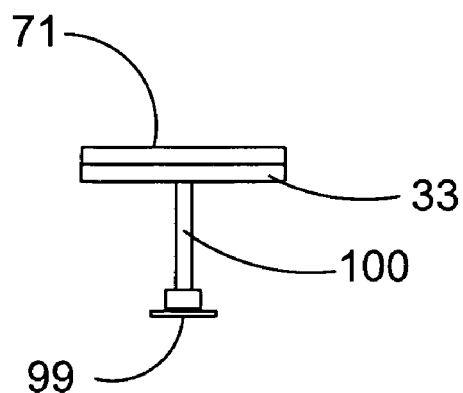
FIG. 8 is a fragmentary end elevational view derived from a position generally to the left of FIG. 6 and looking towards the right, with portions of the stand omitted for clarity; and, FIG. 9 is a fragmentary end elevational view derived from a position generally to the left of FIG. 7 and looking towards the right, with portions of the stand omitted for clarity.
Figure 9:
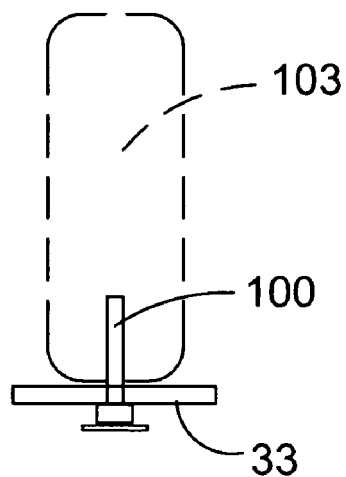

The vertical frame section 18 supports a pair of preferably arched ramps 55, 56 that are respectively hinged to front wheel supports 25, 26. Each ramp comprises a pair of spaced apart frame rails 58, 59 that are traversed by multiple, transverse ties 60 that provide strength and add vehicle traction. The removable, drive-on ramps 55, 56 are coupled with hinges formed of axially aligned clevis tubes 62 (FIG. 1, 3) that are removably secured by hinge pins 64. The ramps may be foldably deployed in the retracted position illustrated in FIG. 5 simply by pivoting them about pins 64. However, if the hinge pins 64 are removed, the ramps may be removed altogether for shipping or storage.

Figure 2:
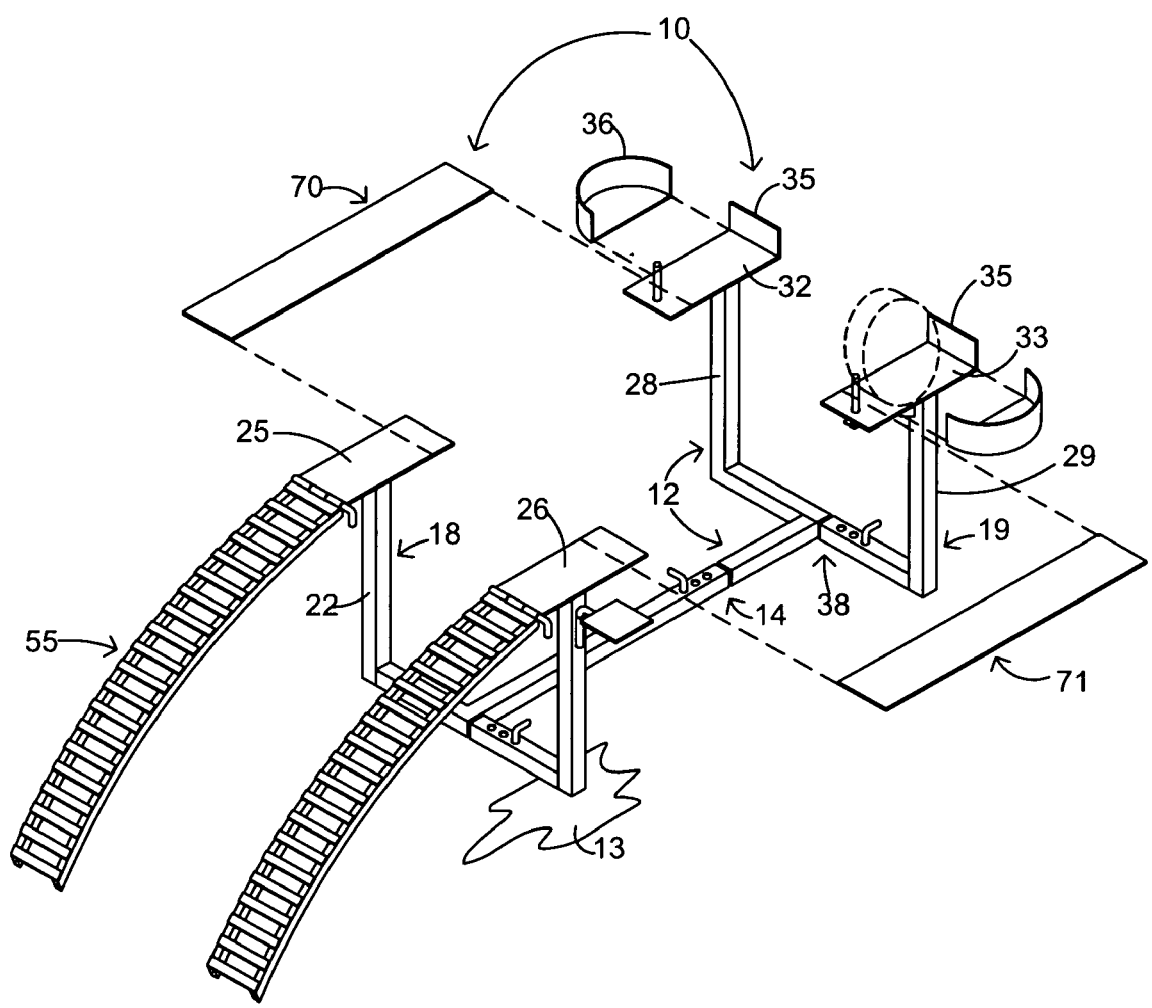
FIG. 2 is a partially exploded isometric view of the stand, showing how various parts may be quickly removed to provide access to the mower or item being serviced.
Figure 3:
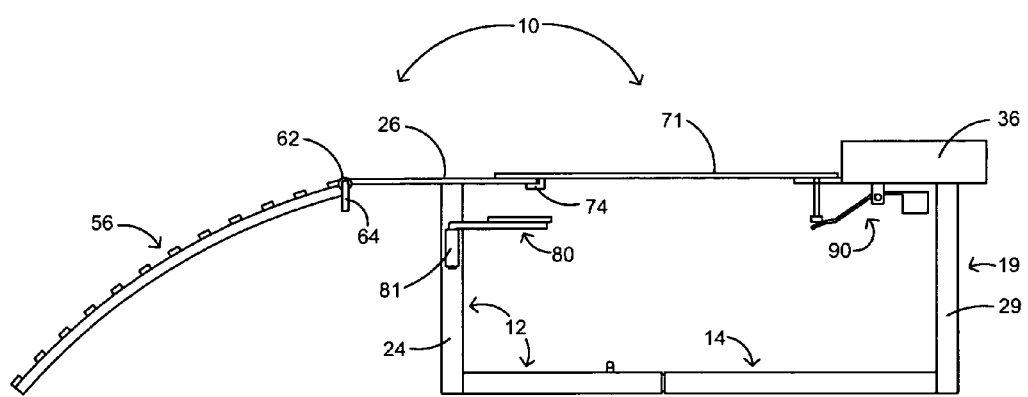
FIG. 3 is a side elevational view of the preferred ramp.
Figure 4:
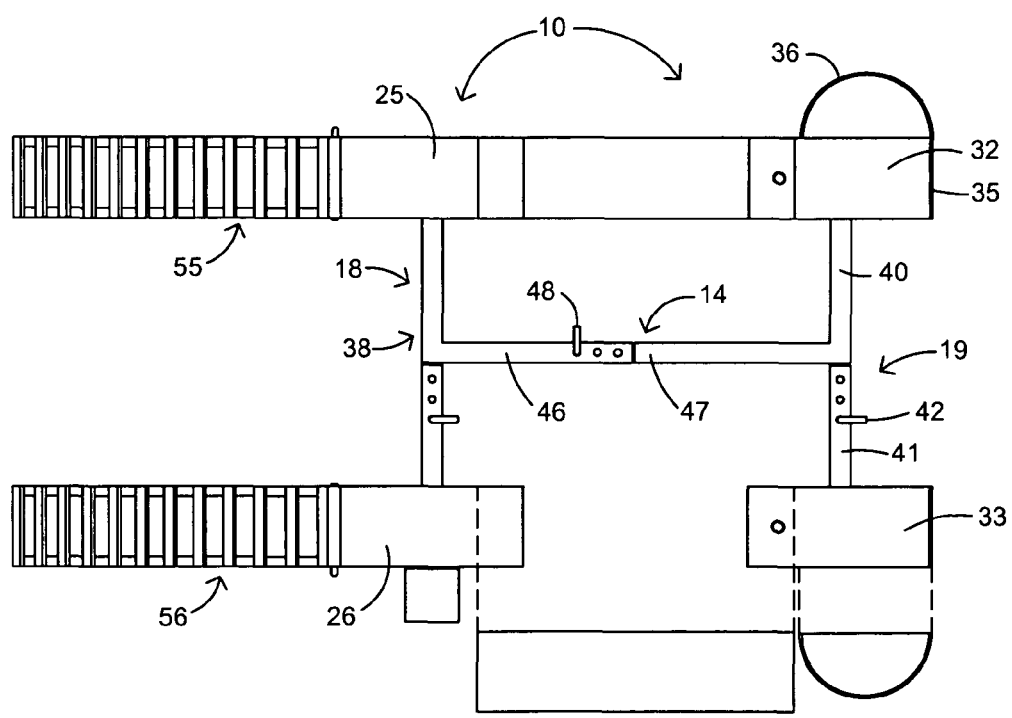
FIG. 4 is a top plan view thereof, with dashed lines indicating the path of displaceable parts.

Normally, a pair of elongated spans 70, 71 are removably coupled between front and rear vertical frame sections to temporarily provide a travel pathway. When installed, spans 70, 71 are disposed parallel with one another (i.e., FIG. 1), and parallel with the longitudinal frame section 14 beneath them. Each span is elongated and generally rectangular, and preferably made of braced steel. Each end may include an integral, shortened folded segment 74 (FIG. 3) that sandwiches a support plate (i.e., 26, FIG. 1) on one of the vertical stanchions to support the spans in place. Once a mower is disposed atop the stand 10, and the driver exits the stand, the spans 70, 71 can be slidably moved sideways for removal as indicated in FIG. 2. A step swing 80 pivoted to the side of vertical stanchion 24 (FIG. 3) by hinge 81 can be swung into place to provide a convenient step for climbing down off the stand 10. When the driver or user reaches the ground after exiting the stand and parking the mower, and removes the spans 70, 71 as aforesaid, the sides of an elevated mower to be serviced, and the undercarriage are readily exposed for service.

Removal of the spans 70, 71 automatically deploys safety mechanisms 90 that prevent subsequent rearward movement of the mower's front wheels. The safeties 90 are automatic, and gravity operated. Preferably, each safety 90 is associated with supports 32, 33 associated with vertical frame section 19 at the stand rear. For example, placement is illustrated well in FIG. 3. Since each safety 90 is similar, only one will be described.

Turning now to FIGS. 6-9, a safety 90 includes a rigid, downwardly projecting pivot tab 92 extending from the bottom of support plate 33. An angular strut 96 is pivoted to tab 92 at pivot juncture 94 penetrating the intermediate portion of the strut. A counterweight 98 thus tends to deflect the opposite strut contact end 99 upwardly, as in FIG. 7, in response to gravity. End 99 however engages the bottom of a vertically aligned peg 100 that is disposed as in FIG. 6 when a mower enters the stand. In this instance, the top of the peg 100 penetrates support 33, and engages a span 71, helping to secure it and being blocked from further movement. When a span 71 is to be removed, the peg 100 is first manually depressed, against leveraged pressure from counterweight 98, and the span is removed as previously mentioned. Once removed, the peg 100 is freed, and it moves upwardly instantly, to the position of FIGS. 7 and 9, where it is maintained by counterweight 98. A seen in FIG. 9, peg 100 thus blocks a front tire 103 of the mower, so reward mower movement is prevented.

Once service is complete, the safeties may be reset, and the spans can be reinstalled. The lawnmower can then be backed off the stand. The arched configuration of the rams minimizes deck contact. Removable guards 36 associated with each front wheel support prevent sideways wheel movements, facilitating use of the stand with zero turn mowers. With service completed, the foldable ramps may be removed, and the stand may be broken down for transportation or storage.

Platform Materials and Specifications:
3/16"×2"×2" steel square tubing for frame
1/4"×8" steel plate for wheel rest plates
3/16"×8" steel removable center plates with a 1/16"×1"×1" angle brace running the length of the center plates
1/8"×1"×1" steel square tubing for ramp build up
5" steel hinges for ramp raising Industrial Specifications:
3'16"×2"×2" steel square tubing for frame
1/4"×10" steel plate for wheel rest plates
1/4"×10" steel removable center plates
1/8"×1"×1" steel tubing for ramp build up
6" steel hinges for ramp raising From the foregoing, it will be seen that this invention is one well adapted to obtain all the ends and objects herein set forth, together with other advantages, which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A service stand for elevating riding lawn mowers, ATV's, garden tractors, snowmobiles and motorized implements above ground for service and repairs, the stand comprising:
    a rigid frame adapted to be disposed upon a supporting surface, the frame comprising first and second spaced-apart, vertical frame sections and an elongated, longitudinal section extending between and connecting the first and second vertical frame sections;
    said first vertical frame section comprises a pair of parallel, spaced-apart vertical stanchions that project upwardly which secure generally planar, horizontal wheel supports;
    said second vertical frame section comprises a pair of parallel, spaced-apart vertical stanchions that project upwardly which secure generally planar, horizontal wheel supports that have wheel stops defined on them to prevent forward movement of a riding lawn mowers, ATV, garden tractor, snowmobile or other motorized implements disposed on said stand for service;
    removable guards associated with each horizontal wheel support on said second vertical frame section to prevent sideways wheel movements, facilitating use of the stand with zero turn mowers;
    a pair of spans removably coupled between said first and second vertical frame sections to provide a travel pathway over the stand, said spans disposed parallel with one another, and parallel with the longitudinal frame section beneath them;
    a pair of drive-on ramps pivotally interconnected with said first vertical frame section;
    safeties associated with at least one of said vertical frame sections for automatically deploying in response to removal of said spans to prevent movement of a riding lawn mower, ATV, garden tractor, snowmobile or other motorized implement disposed on said stand.

2. The stand as defined in claim 1 wherein said spans are slidably coupled between wheel supports on said first vertical frame section and wheel supports on said second vertical frame section.

3. The stand as defined in claim 2 wherein said ramps are arched to prevent contact with a lawn mower deck.

4. The stand as defined in claim 3 wherein said vertical stanchions of said first and second vertical frame sections are joined at their bottoms by an elongated, transverse crosspiece that is telescopingly adjustable.

5. The stand as defined in claim 4 wherein said longitudinal frame section is telescopingly adjustable in length.

6. The stand as defined in claim 1 wherein said safeties comprise:
    an angular strut having a counterweight at one end, a spaced-apart contact end, and an intermediate portion;
    a pivot point at said strut intermediate portion, whereby downward movement of the counterweight in response to gravity deflects the strut contact end upwardly;
    a vertically aligned peg having a top normally contacting a span and a bottom touched by said strut contact end;
    wherein when a span is removed the peg automatically deploys to block a tire.

7. A service stand for elevating riding lawn mowers, ATV's, garden tractors, snowmobiles and motorized implements above ground for service and repairs, the stand comprising:
    a rigid frame adapted to be disposed upon a supporting surface, the frame comprising first and second spaced-apart, vertical frame sections and an elongated, longitudinal section extending between the first and second vertical frame sections;
    a pair of spans removably coupled between said first and second vertical frame sections to provide a travel pathway over the stand;
    a pair of arched ramps interconnected with said first vertical frame section;
    said first vertical frame section comprising a pair of parallel, spaced-apart vertical stanchions that project upwardly which secure generally planar, horizontal wheel supports;
    said second vertical frame section comprises a pair of parallel, spaced-apart vertical stanchions that project upwardly which secure generally planar, horizontal wheel supports that have wheel stops defined on them to prevent forward movement of a riding lawn mower, ATV, garden tractor, snowmobile or other motorized implement disposed on said stand for service;
    safeties associated with at least one of said vertical frame sections for automatically deploying in response to removal of said spans to prevent movement of a riding lawn mower, ATV, garden tractor, snowmobile or other motorized implement disposed on said stand; and, wherein said spans are slidably coupled between wheel supports on said first vertical frame section and wheel supports on said second vertical frame section.

8. The stand as defined in claim 7 including removable guards associated with each horizontal wheel support on said second vertical frame section to prevent sideways wheel movements, facilitating use of the stand with zero turn mowers.

9. The stand as defined in claim 8 wherein:

said vertical stanchions of said first and second vertical frame sections are joined at their bottoms by an elongated, transverse cross-piece that is telescopingly adjustable; and, said longitudinal frame section is telescopingly adjustable.

10. The stand as defined in claim 1 wherein said safeties comprise:

an angular strut having a counterweight at one end, a spaced-apart contact end, and an intermediate portion;

a pivot point at said strut intermediate portion, whereby downward movement of the counterweight in response to gravity deflects the strut contact end upwardly;

a vertically aligned peg having a top normally contacting a span and a bottom touched by said strut contact end;

wherein when a span is removed the peg automatically deploys to block a tire.

11. A service stand for elevating riding lawn mowers, ATV's, garden tractors, snowmobiles and motorized implements above ground for service and repairs, the stand comprising:

a rigid frame adapted to be disposed upon a supporting surface, the frame comprising first and second spaced-apart, vertical frame sections and an elongated, longitudinal section extending between the first and second vertical frame sections;

a pair of spans removably coupled between said first and second vertical frame sections to provide a travel pathway over the stand;

a pair of ramps interconnected with said first vertical frame section;

said first vertical frame section comprising generally planar, horizontal wheel supports;

a second vertical frame section comprising generally planar, horizontal wheel supports;

safeties associated with at least one of said vertical frame sections for automatically deploying in response to removal of said spans to prevent movement of a riding lawn mower, ATV, garden tractor, snowmobile or other motorized implement disposed on said stand., the safeties comprising:

an angular strut having a counterweight at one end, a spaced-apart contact end, and an intermediate portion;

a pivot point at said strut intermediate portion, whereby downward movement of the counterweight in response to gravity deflects the strut contact end upwardly;

a vertically aligned peg having a top normally contacting a span and a bottom touched by said strut contact end; and, wherein the peg automatically deploys to block a tire when a span is removed.

12. The stand as defined in claim 11 wherein:

said first and second vertical frame sections are joined at their bottoms by an elongated, transverse cross-piece that is telescopingly adjustable; and, said longitudinal frame section is telescopingly adjustable.

13. The stand as defined in claim 12 wherein said spans are slidably coupled between wheel supports on said first vertical frame section and wheel supports on said second vertical frame section.

* * * * *